(12) United States Patent
Galazin

(10) Patent No.: US 7,497,450 B2
(45) Date of Patent: Mar. 3, 2009

(54) SHRINK FIT SUSPENSION ARRANGEMENT

(75) Inventor: Greg T. Galazin, Muskegon, MI (US)

(73) Assignee: SAF-Holland, Inc., Holland, MI (US)

( * ) Notice: Subject to any disclaimer, the term of this patent is extended or adjusted under 35 U.S.C. 154(b) by 507 days.

(21) Appl. No.: 11/092,271

(22) Filed: Mar. 29, 2005

(65) Prior Publication Data

US 2006/0220337 A1 Oct. 5, 2006

(51) Int. Cl.
*B60G 9/00* (2006.01)
(52) U.S. Cl. ............................................. 280/124.116
(58) Field of Classification Search .......... 280/124.116, 280/124.11, 124.157, 124.128, 124.162
See application file for complete search history.

(56) References Cited

U.S. PATENT DOCUMENTS

| | | | |
|---|---|---|---|
| 3,547,215 A | 12/1970 | Bird | |
| 4,693,486 A | 9/1987 | Pierce et al. | |
| 5,116,075 A | 5/1992 | Pierce | |
| 5,203,585 A * | 4/1993 | Pierce | 280/124.116 |
| 5,328,159 A | 7/1994 | Kaufman et al. | |
| 5,366,237 A | 11/1994 | Dilling et al. | |
| 5,788,263 A * | 8/1998 | VanDenberg | 280/124.116 |
| 6,491,314 B2 | 12/2002 | Smith et al. | |
| 6,805,369 B2 | 10/2004 | Galazin | |

FOREIGN PATENT DOCUMENTS

| | | |
|---|---|---|
| DE | 4232778 | 1/1994 |
| DE | 4232779 | 2/1994 |
| WO | 9706022 | 2/1997 |

* cited by examiner

*Primary Examiner*—Faye M. Fleming
(74) *Attorney, Agent, or Firm*—Price, Heneveld, Cooper, DeWitt & Litton, LLP

(57) ABSTRACT

A method for making a vehicle suspension assembly includes forming a beam having a forward end defining a pivot, and a rearward end having an axle-receiving opening therethrough defined by a surface. At least a portion of the surface is generally cylindrical, and the surface defines a first diameter when the beam is at a first temperature. The method further includes providing an axle defining an axis and having a generally cylindrical outer surface portion defining a second diameter when the axle is at the first temperature, and wherein the second diameter is larger than the first diameter. The method further includes raising the temperature of the beam to expand the axle-receiving opening. The axle is then inserted into the axle-receiving opening while the opening is expanded due to the elevated temperature. The temperature of the beam is then lowered to provide a tight interference fit between the beam and the axle member.

10 Claims, 5 Drawing Sheets

SHRINK FIT SUSPENSION ARRANGEMENT

BACKGROUND OF THE INVENTION

1. Field of the Invention

The invention relates to a trailing arm suspension. In one of its aspects, the invention relates to a trailing arm suspension having a beam that utilizes a shrink fit to secure the spring beam to an axle without welding.

2. Description of the Related Art

Trailing arm suspensions are well known and commonly used in heavy-duty applications such as a tractor-trailer configuration. The trailing arm suspension typically comprises a pair of spaced trailing arm assemblies mounted to opposite sides of the vehicle, with each trailing arm assembly carrying an axle supporting the vehicle wheels.

The trailing arm assembly comprises a trailing arm having one portion pivotally mounted to a hanger bracket that depends from a vehicle frame rail. An air spring is disposed between another portion of the trailing arm and the vehicle frame rail to dampen the rotation of the trailing arm relative to the vehicle frame.

An important function of the trailing arm suspension is compliance in response to vehicle roll-induced forces. The vehicle roll-induced forces are typically created during the turning of the vehicle. As the vehicle is turned, the vehicle tends to rotate about its longitudinal axis in response to the G-forces encountered during the turn, causing one side of the vehicle to drop and another side of the vehicle to rise. This relative movement results in a corresponding relative rotational movement between the trailing arms on opposite sides of the vehicle. The suspension must be sufficiently compliant to permit some rolling of the vehicle in order to avoid undue torsional stress on the axles. However, the suspension must also be sufficiently stiff to resist vehicle roll beyond a predetermined roll angle for safety reasons. Generally, it is desirable to limit vehicle roll to a roll angle of about 2½ degrees for most trailing arm suspensions. The roll angle is the arc traversed by trailer about its longitudinal axis measured relative to a horizontal line passing through the center of gravity of the vehicle.

In rigid beam trailing arm suspensions, the roll stiffness of the suspension is achieved through the mechanical torquing of the axle as the rigid trailing arms move relative to each other to twist or torque the axle. If the mechanical torquing of the axle is too great, it can cause premature failure of the axle. The suspensions are made compliant to the roll with the use of a resilient connection between either or both the pivotal connection of the trailing arms to the hanger bracket and the connection of the axle to the trailing arm. The resilient connections are typically achieved by elastomeric bushings.

An ideal trailing arm suspension is substantially compliant up through about 2½ degrees of roll angle and then quickly becomes stiff to prevent the vehicle from rolling through too great of a roll angle. In other words, on a plot of roll moment versus roll angle, an ideal suspension will have a generally linear relationship between the roll moment and roll force until the compliance is exceeded then the curve will tend toward being infinite.

An alternative to the rigid beam trailing arm is a flexible beam also known as a spring beam. A spring beam typically is manufactured from spring steel that is capable of flexing in the vertical direction in response to vertical forces. One end of the spring beam is mounted to a hanger bracket by either a pinned connection or a resilient connection in the nature of an elastomeric bushing. The other end of the spring beam is rigidly mounted to the axle, usually through a bolted connection with an axle bracket that is welded to the axle, thus eliminating the need for a resilient connection between the axle and the beam. The spring beam advantageously functions much like a spring in that the response is relatively linear.

Typically, the axles must be made of sufficient thickness so that the torsional resistance of the axle at the welded joint is sufficient to meet torsional requirements for the suspension. On the other hand, non-welded axle connections can have thinner wall thickness and thus less weight and cost for the same suspension rating. Trailing arm suspensions with non-welded axle connections are disclosed in WO 97/06022, published Feb. 20, 1997, and U.S. Pat. No. 6,805,369.

SUMMARY OF THE INVENTION

One aspect of the present invention is a method for making a vehicle suspension assembly. The method includes forming a beam having a first end defining a pivot, and a second end having an axle-receiving opening therethrough defined by a surface, wherein at least a portion of the surface is generally cylindrical. The surface defines a first diameter when the beam is at a first temperature. The method further includes providing an axle defining an axis and having a generally cylindrical outer surface portion defining a second diameter when the axle is at the first temperature, and wherein the second diameter is less than or equal to the first diameter. The method further includes providing a temperature differential between the beam and the axle such that the first diameter is about equal to or greater than the second diameter. The axle is then inserted into the axle-receiving opening, and the temperature of the beam is then lowered to provide a tight interference fit between the beam and the axle member, such that a welded joint is not required.

Another aspect of the present invention is a vehicle suspension assembly including an elongated axle member having a tubular construction and defining an outer surface. The suspension assembly also includes a beam member having a first end defining a pivot and a second end having a preformed opening therethrough having a substantially continuous non-welded perimeter surface extending around and contacting the outer surface of the axle member in a tight interference fit that secures the beam member to the axle member.

Yet another aspect of the present invention is a method of making a vehicle suspension including providing an elongated axle member having an outer surface defining a perimeter. The method includes providing a beam member having an opening therethrough that is smaller than the perimeter of the axle when the axle member and the beam member are at the same temperature. The temperature of the beam member is raised relative to the temperature of the axle member until the opening through the beam member is about the same or larger than the perimeter of the axle. The axle member is inserted into the opening through the beam member, and the temperature of the beam is lowered to shrink the opening and form a tight interference fit between the beam member and the axle member.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
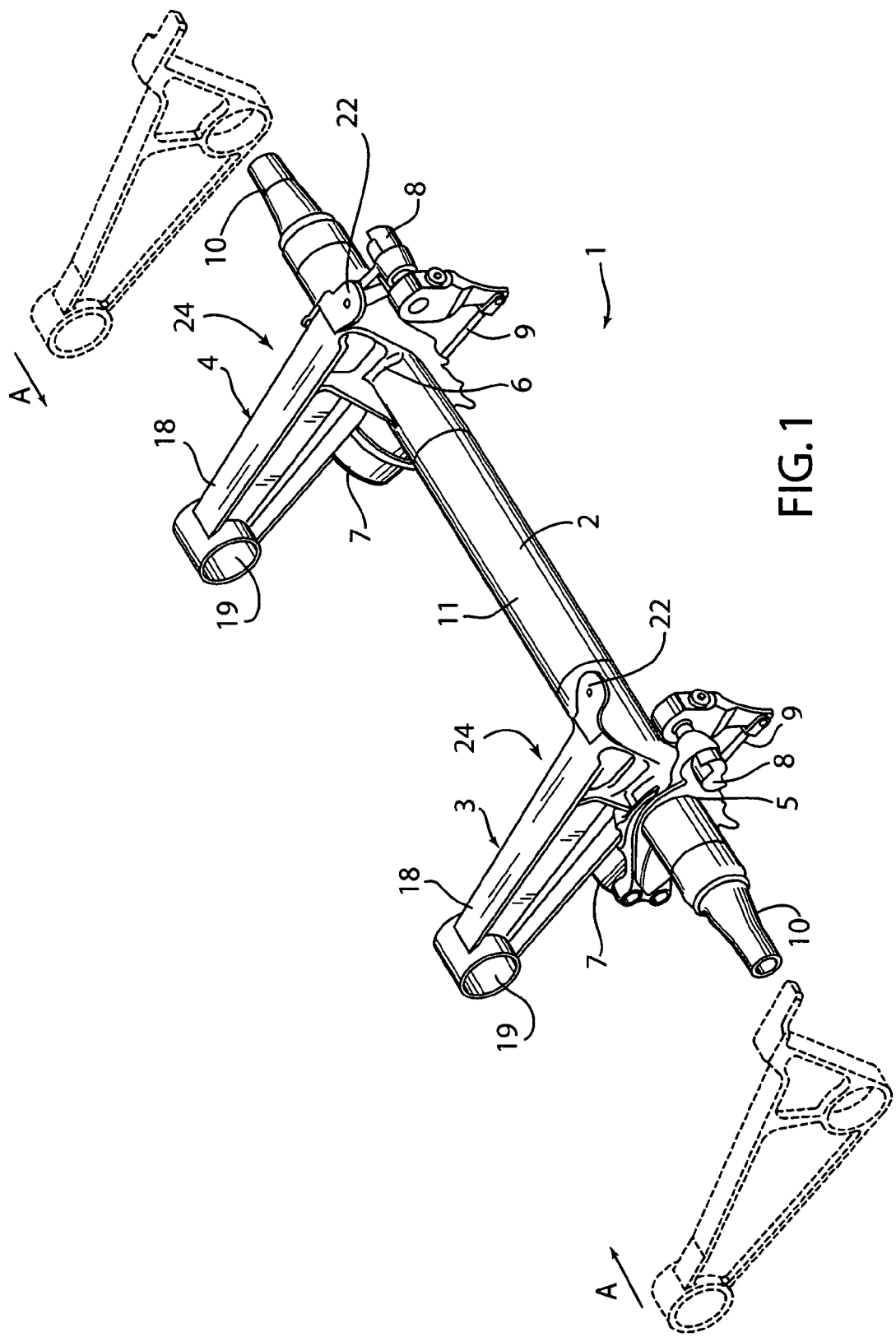
FIG. 1 is a perspective view of a suspension according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A suspension assembly 1 according to one aspect of the present invention (FIG. 1) includes an axle 2, a left beam 3 and a right beam 4. Axle 2 is an elongated tubular member having a cylindrical outer surface 11. As discussed in more detail below, the axle 2 is received in openings 5 and 6 of beams 3 and 4, respectively, in a tight interference fit such that the beams 3 and 4 do not need to be welded to the axle 2. The suspension assembly 1 includes a conventional brake system including cylinders 7 that are interconnected with S-cams 8 via a linkage assembly 9. The axle 2 includes conventional spindles 10 at the outer ends thereof for mounting wheels (not shown).

Figure 2:
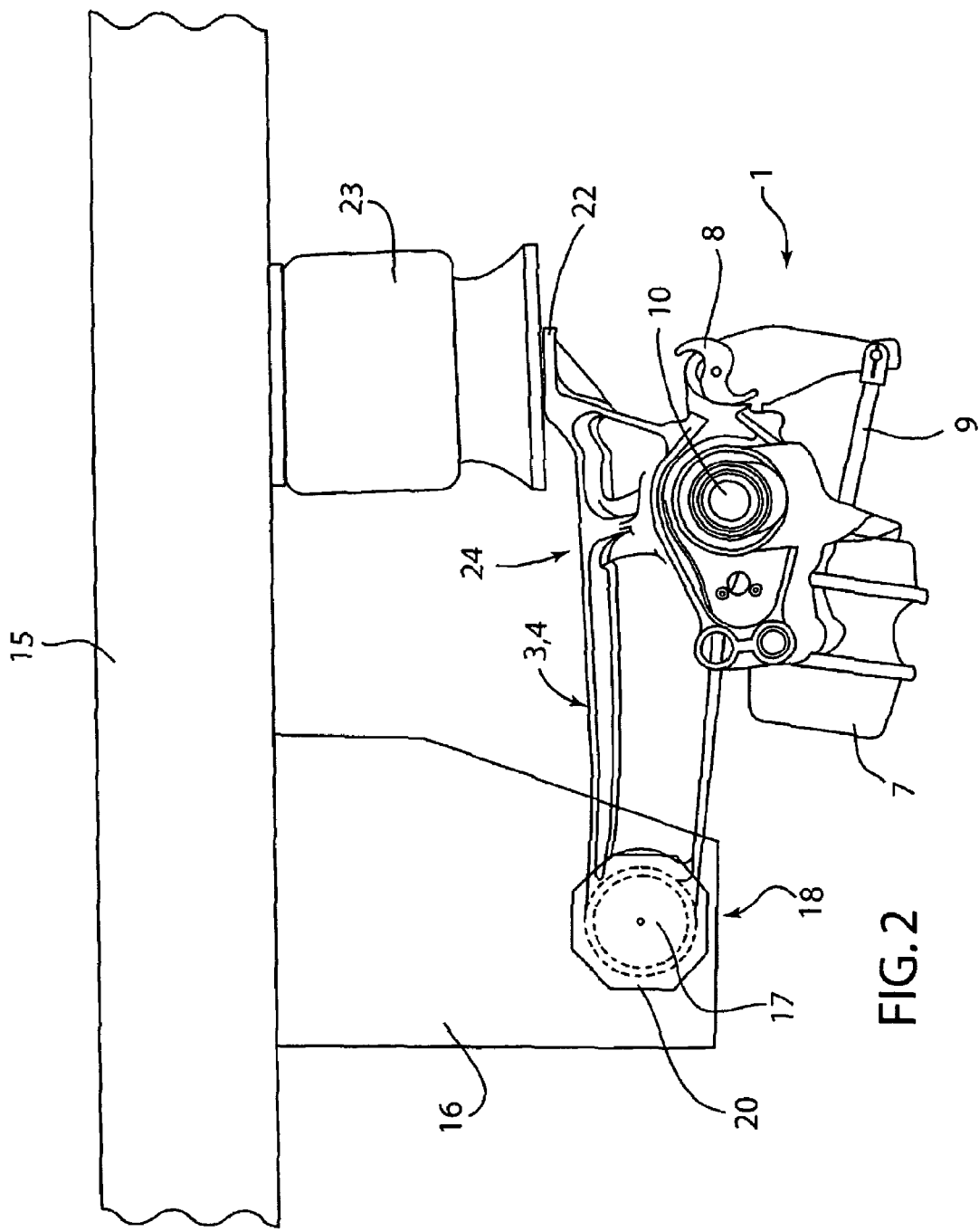
FIG. 2 is a fragmentary elevational view of the suspension assembly of FIG. 1.

With further reference to FIG. 2, suspension assembly 1 is connected to a vehicle frame 15 via a pair of hanger brackets 16 forming a pivot 17 at front ends 18 of beams 3 and 4. Conventional bushed connectors 20 are received in openings 19 at the front ends 18 of beams 3 and 4 to form pivots 17 to pivotally interconnect the beams 3 and 4 to the hanger brackets 16. The beams 3 and 4 include a pad 22 at the rearward ends 24 of beams 3 and 4. The pads 22 connect to conventional air springs 23 that resiliently transmits forces from the beams 3 and 4 to the vehicle frame 15.

Figure 3:
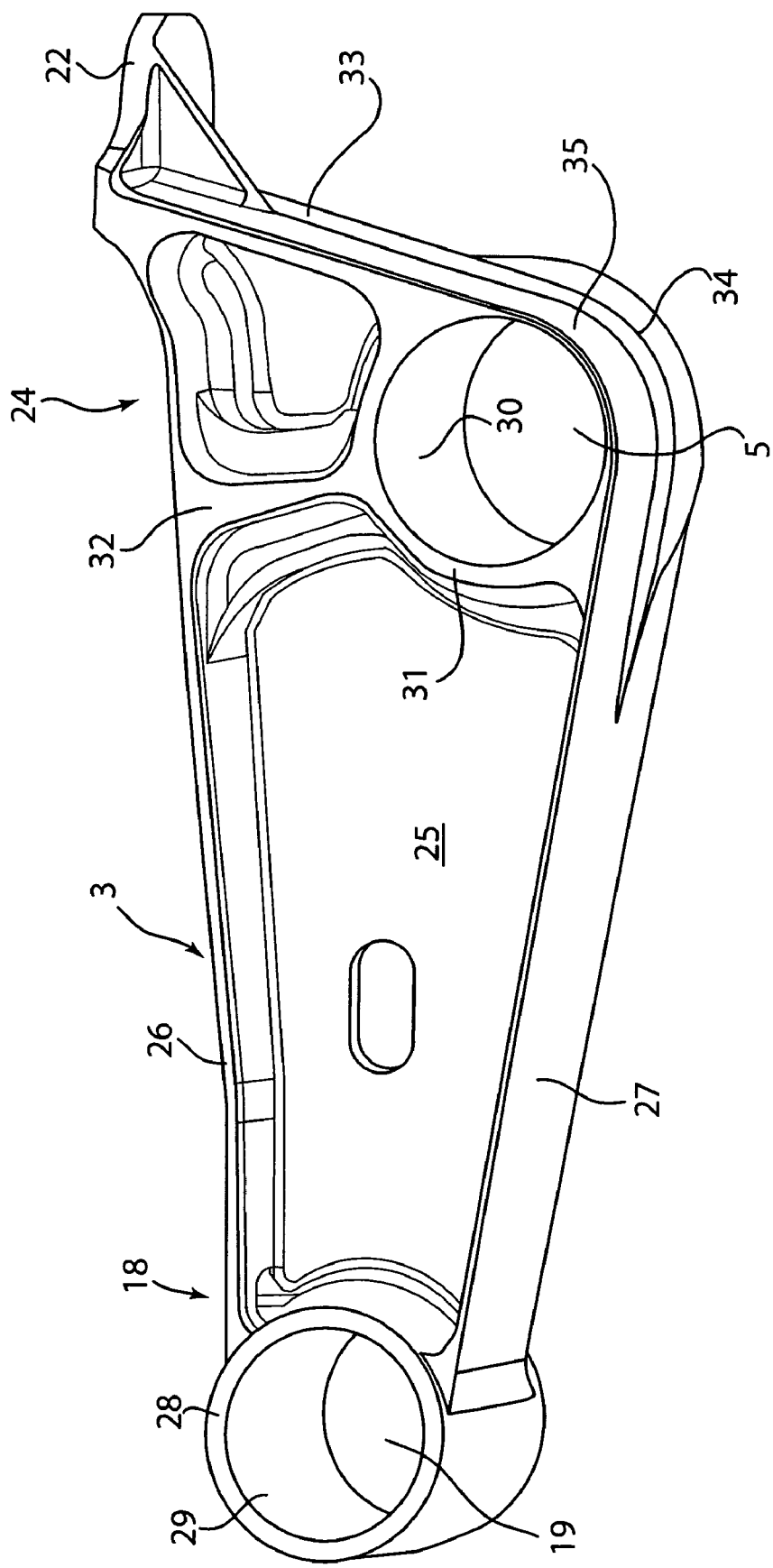
FIG. 3 is a perspective view of a beam member of the suspension of FIG. 1.
Figure 4:
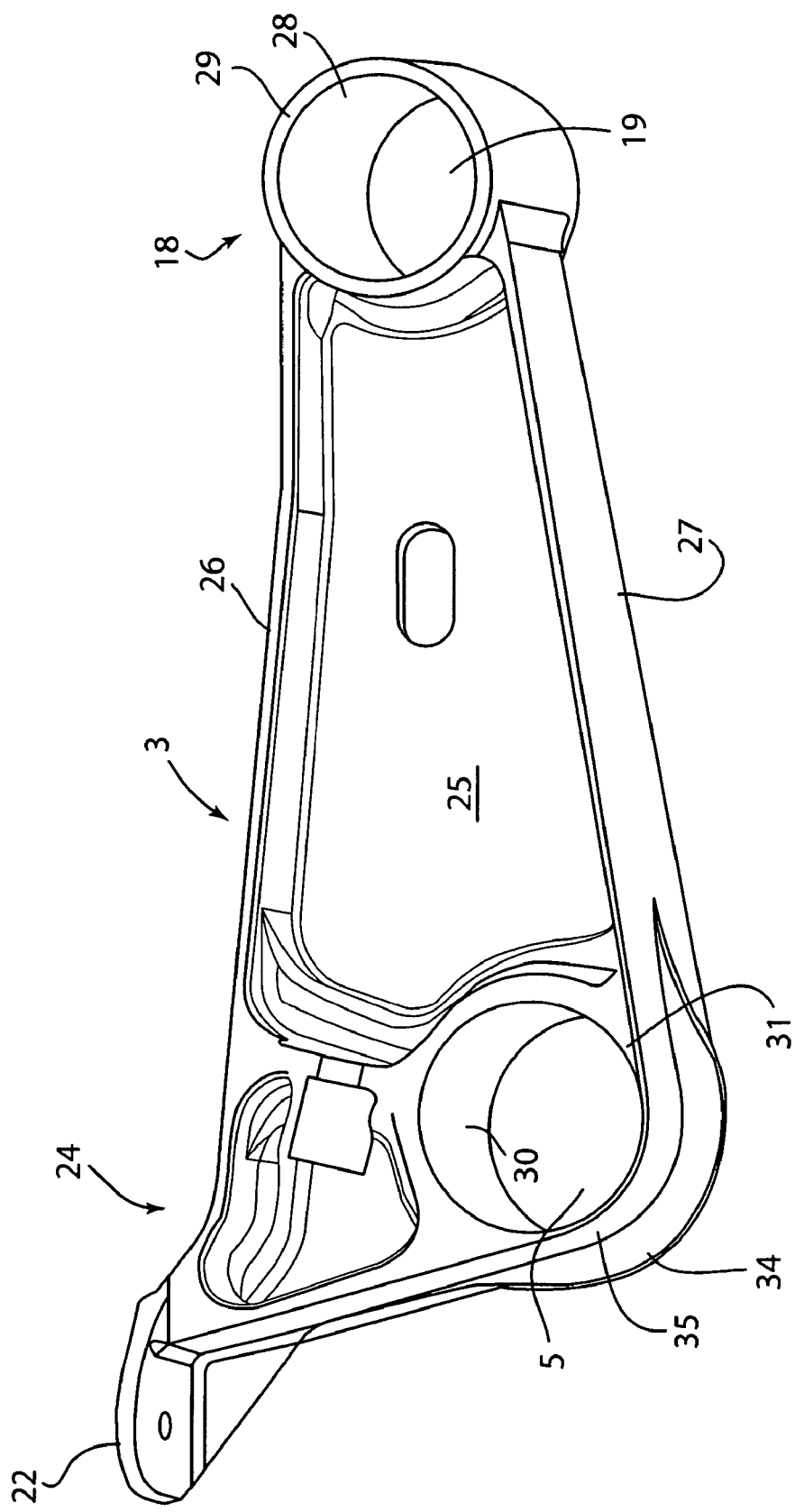
FIG. 4 is a perspective view of a beam member of the suspension of FIG. 1.

FIGS. 3 and 4 show a left beam 3. It will be readily understood that beam 4 is substantially identical to left beam 3, except that right beam 4 is a mirror image of left beam 3. Beam 3 has an I-shaped cross section including a vertical web 25, a horizontal upper web 26, and a horizontal lower web 27. A cylindrical wall 28 is integrally formed with the webs 25-27 at front end 18 of beam 3, and includes an inner surface 29 forming opening 19. The rearward end 24 of beam 3 includes an opening 5 therethrough defined by an inner surface 30. At least a portion of the inner surface 30 is preferably cylindrical. The cylindrical surface 30 defines a predetermined size when the beam 3 is at a known temperature (e.g., room temperature, or about 72 degrees). A side wall or web 31 extends around cylindrical surface 30, and is integrally formed with webs 25-27. A web 32 extends upwardly from side wall 31, and joins with upper web 26. An upwardly extending rear web 33 is also integrally formed with vertical web 25, side wall 31, and upper web 26. A flange 34 extends around an outer portion 35 of side wall 31 to provide additional strength.

The beams 3 and 4 are preferably cast from steel or other suitable material. The axle 2 is also formed from steel or the like. If required, the inner surfaces 30 of the beams 3 and 4 may be machined to a relatively high tolerance following the casting operation. Similarly, the outer surface 11 of axle 2 may be machined to provide an accurate cylindrical shape if required. The cylindrical surface 30 and defines a first diameter when the beams 3 and 4 are at a first temperature, such as 72° F. At the first temperature, the outer surface 11 of axle 2 defines a second diameter that is somewhat larger than the first diameter defined by inner surface 30 of opening 5. Thus, when the axle 2 and beams 3, 4 are at the same temperature, an interference fit occurs between the opening 5 in beams 3 and 4 and the outer surface 11 of axle 2. To assemble the beams 3 and 4 to the axle 2, the temperature of the beams 3 and 4 is elevated relative to the axle 2, thereby increasing the diameter of opening 5 due to thermal expansion of the beams 3 and 4. The temperature of the beams 3 and 4 is preferably sufficiently high relative to the axle 2 to cause the opening 5 to expand, such that the diameter defined by the cylindrical surface 30 is temporarily greater than the diameter defined by outer surface 11 of axle 2. The beams 3 and 4 can then be slid onto the ends of the axle 2 as illustrated by the arrows "A", FIG. 1. The temperature of the beams 3 and 4 is then lowered, thereby causing the opening 5 to shrink and form a tight interference fit around the cylindrical outer surface 11 of axle 2. It will be readily appreciated that a fixture (not shown) or the like may be utilized to align and support the beams 3 and 4 during assembly to the axle 2. In a preferred embodiment, the opening 5 defines a diameter that is 0.020 inches smaller than the diameter defined by cylindrical surface 11 of axle 2 when the beams 3 and 4 are disassembled from the axle 2, and the axle 2 and beams 3 and 4 are at the same temperature. Thus, when the beams 3 and 4 are installed on axle 2, a shrink fit having a nominal interference of 0.020 inches is formed. It will be understood that the axle 2 could be cooled to reduce the diameter of axle 2 relative to openings 5 in beams 3 and 4 to facilitate assembly. Furthermore, it will be understood that the beams 3 and 4 could be raised only enough to permit press fit of beams 3, 4 onto axle 2. The temperature of the beams 3, 4 and axle 2 would then be equalized to provide a greater interference fit. The shrink fit assembly of the present invention provides a quick and secure way to assemble the beams 3 and 4 to the axle 2, without requiring welds, clamps, or the like. In this way, the assembly of the suspension is greatly simplified.

Figure 5:
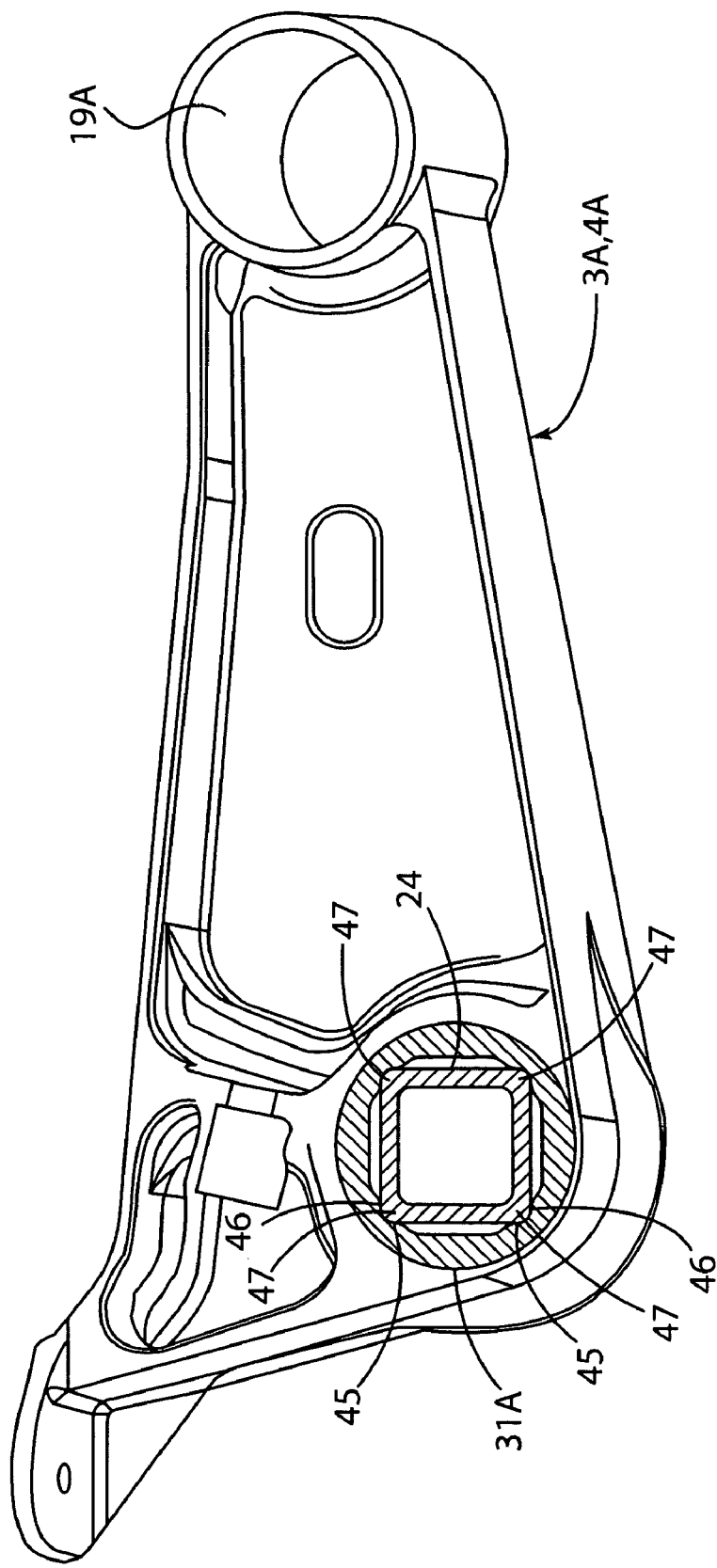
FIG. 5 is a fragmentary cross-sectional view of an axle and beam according to another aspect of the present invention.

With reference to FIG. 5, a square tubular axle 2A may also be utilized. A side wall 31A of a beam 3A or 4A includes V-shaped surfaces 45 and 46 that fit tightly against corners 47 of square axle 2A. The surfaces 45 and 46 are formed to provide a tight interference fit with the corners 47 of square axle 2A in a substantially similar manner to the arrangement described in more detail above in connection with the embodiment of FIGS. 1-4. It will be readily appreciated that a wide variety of axle shapes and constructions and/or beams may be utilized without departing from the present invention.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method of making a vehicle suspension assembly, comprising:

forming a first beam having a first end defining a pivot, and a second end having an axle-receiving opening therethrough defined by a surface, at least a portion of the surface being generally cylindrical and defining a first diameter when the beam is at a first temperature;

providing an axle defining an axis having a generally cylindrical outer surface portion defining a second diameter when the axle is at the first temperature, wherein the second diameter is less than or about the same size than the first diameter;

providing a temperature differential between the first beam and the axle such that the first diameter is about equal to or greater than the second diameter;

inserting the axle into the axle-receiving opening while providing the temperature differential; and removing the temperature differential between the first beam and the axle to provide a tight interference fit between the first beam and the axle; and forming a second beam having a second axle-receiving opening therethrough defined by a second surface, at least a portion of the surface being generally cylindrical defining a third diameter when the beam is at the first temperature;

providing a temperature differential between the beam and the axle such that the third diameter is substantially equal to or greater than the second diameter;

inserting the axle into the second axle-receiving opening; and removing the temperature differential between the beam and the axle to provide a tight interference fit between the second beam and the axle.

2. The method of claim 1, wherein:

the step of providing the temperature differential includes raising the temperature of the beam to expand the axle-receiving opening.

3. A method of making a vehicle suspension assembly, comprising:

forming a first beam having a first end defining a pivot, and a second end having an axle-receiving opening therethrough defined by a surface, at least a portion of the surface being generally cylindrical and defining a first diameter when the first beam is at a first temperature;

providing an axle defining an axis having a generally cylindrical outer surface portion defining a second diameter when the axle is at the first temperature, wherein the second diameter is less than or about the same size than the first diameter;

providing a temperature differential between the first beam and the axle such that the first diameter is about equal to or greater than the second diameter;

inserting the axle into the axle-receiving opening while providing the temperature differential; and removing the temperature differential between the first beam and the axle to provide a tight interference fit between the first beam and the axle;

wherein the beam defines a central portion between the first end and the second end, and including:

forming a vertically extending web in the central portion of the beam.

4. The method of claim 3, including:

forming horizontally extending upper and lower webs that are integrally formed with the vertically extending web to form an I-shaped cross-sectional shape.

5. The method of claim 1, wherein:

the first diameter is 0.010 to 0.030 inches smaller than the second diameter when the beam and the axle are at the same temperature and the beam and the axle are disassembled.

6. The method of claim 5, wherein:

the first diameter is about 0.020 inches smaller than the second diameter when the beam and the axle are at the same temperature.

7. The method of claim 1, wherein:

the axle has a tubular construction with cylindrical inner and outer surfaces.

8. The method of claim 1, wherein:

the step of providing the temperature differential between the second beam and the axle includes raising the temperature of the second beam to expand the second axle-receiving opening.

9. The method of claim 1, wherein:

the first beam is positioned adjacent a first end of the axle, and the second beam is positioned adjacent a second end of the axle.

10. The method of claim 9, including:

securing an air spring to each beam at the second ends thereof.

* * * * *